United States Patent
Bhojan

(10) Patent No.: US 8,390,584 B1
(45) Date of Patent: Mar. 5, 2013

(54) DIGIT AWARE TOUCHSCREEN

(75) Inventor: Narendran Bhojan, Bangalore (IN)

(73) Assignee: Intuit Inc., Mountain View, CA (US)

( * ) Notice: Subject to any disclaimer, the term of this patent is extended or adjusted under 35 U.S.C. 154(b) by 672 days.

(21) Appl. No.: 12/578,535

(22) Filed: Oct. 13, 2009

(51) Int. Cl.
*G06F 3/041* (2006.01)

(52) U.S. Cl. .................. 345/173; 174/18.01; 174/19.01; 715/700

(58) Field of Classification Search .... 178/18.01–19.07; 345/173–178; 715/700–866
See application file for complete search history.

(56) References Cited

U.S. PATENT DOCUMENTS

| | | | |
|---|---|---|---|
| 5,835,079 A * | 11/1998 | Shieh | 345/173 |
| 2006/0125803 A1* | 6/2006 | Westerman et al. | 345/173 |
| 2007/0052686 A1* | 3/2007 | Nomura | 345/173 |

* cited by examiner

*Primary Examiner* — Michael Pervan
(74) *Attorney, Agent, or Firm* — Osha Liang LLP

(57) ABSTRACT

A method for performing a task in a touchscreen device, comprising receiving tactile information from a digit, wherein the tactile information comprises an identifying portion and a touchscreen location of the digit, identifying the digit based on the tactile information, obtaining contextual information from the touchscreen device, wherein the contextual information comprises data describing an execution environment of the touchscreen device, translating, using a controller, a mapping of the tactile information and the contextual information to obtain a task, and performing the task in the touchscreen device, wherein the task performs an action in the execution environment of the touchscreen device.

24 Claims, 14 Drawing Sheets

Data Structure 310

| Identifying Portion of Digit | Location on Touchscreen | Operating System | Application | Task |
|---|---|---|---|---|
| | | | | |
| 3037465017 | 25.107 | OS A | Browser | Scroll Up |
| 7625843590 | 639.448 | OS B | Image Viewer | Enlarge | at Time Instance X

Data Structure 310

| Identifying Portion of Digit | Location on Touchscreen | Operating System | Application | Task |
|---|---|---|---|---|
| | | | | |
| 3037465017 | 59.231 | OS A | SMS | Copy |
| 5850272131 | 351.47 | OS C | Media Player | Play |
| 7589261890 | 681.38 | OS A | SMS | Copy | at Time Instance Y

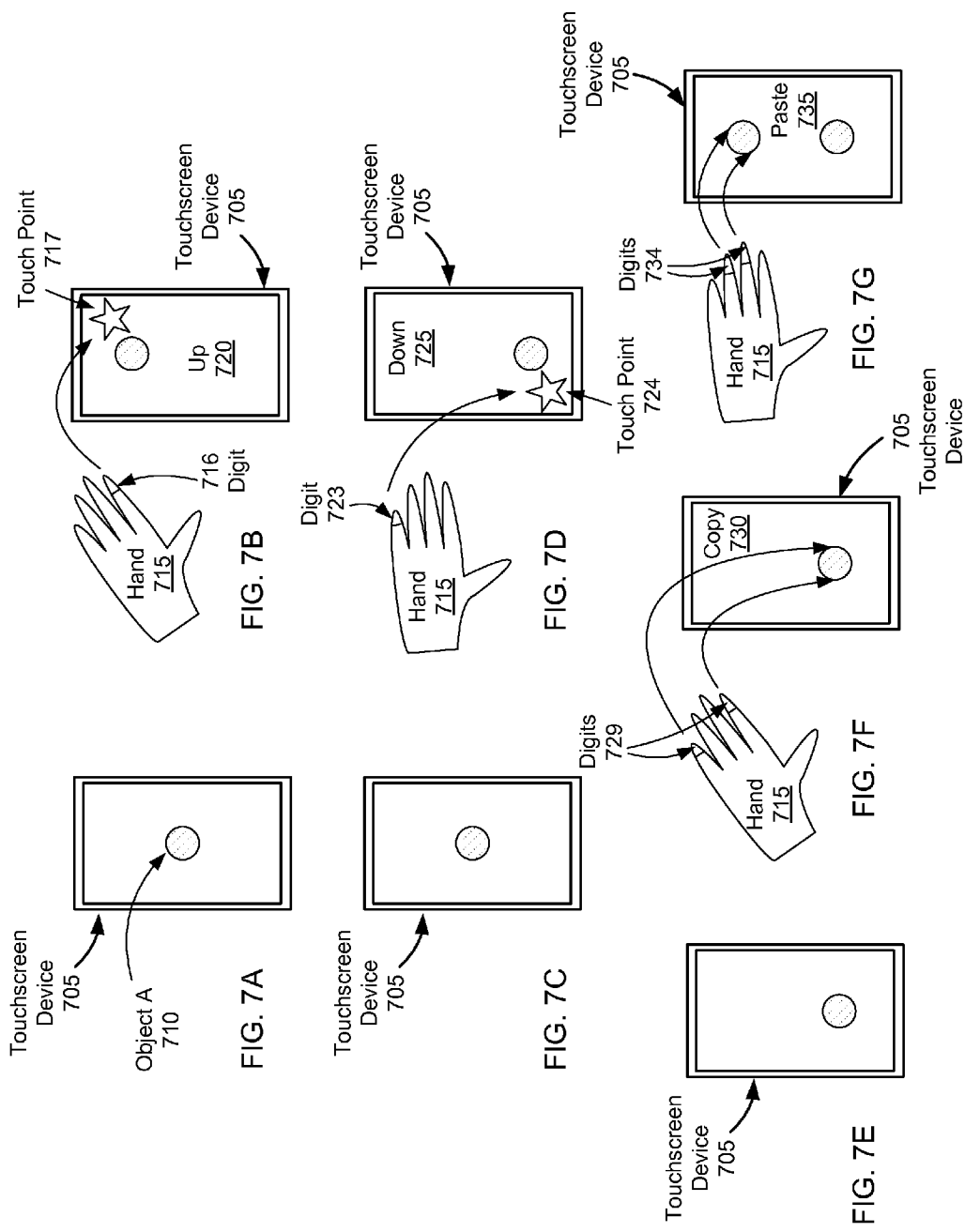

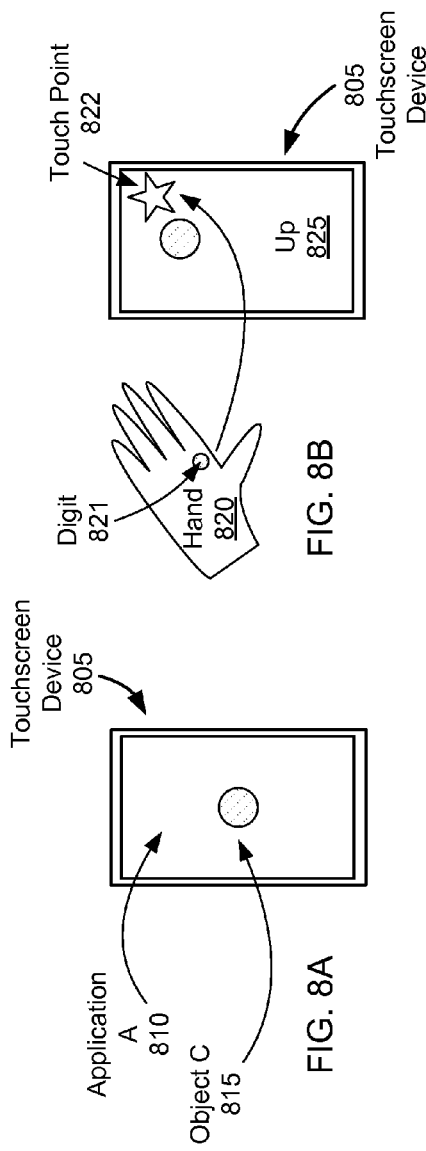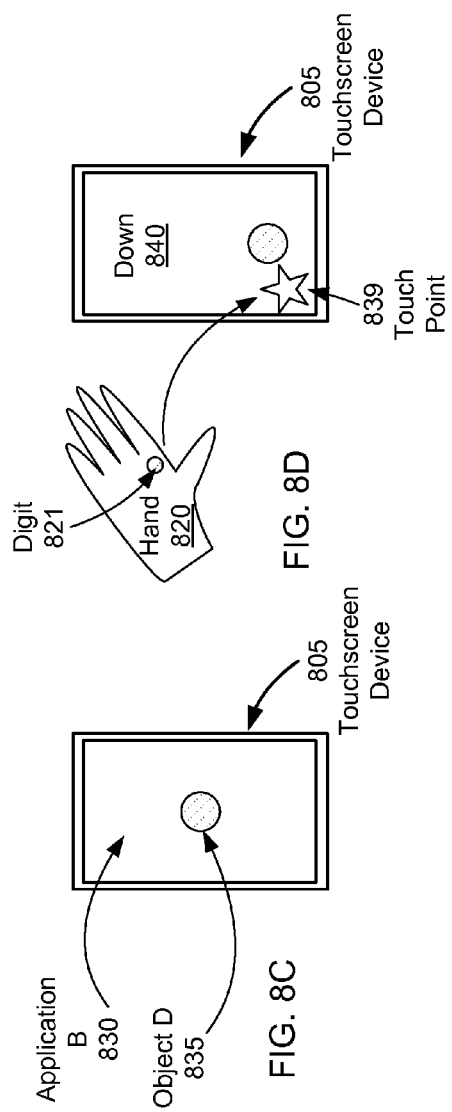

ATM
1005

Please touch the screen with the digit corresponding to your desired bank action.

Press with your thumb to withdraw.

Press with your index finger to make a deposit.

Press with your middle finger to see your balance.

Press with your ring finger to call a representative.

Press with your middle finger and your pinky finger to make a transfer.

Press from the top of the screen to the bottom of the screen with your pinky finger to reset finger settings.

FIG. 10

DIGIT AWARE TOUCHSCREEN

BACKGROUND

Touchscreen devices have recently become widely used devices that are able to detect and accept user interaction through touch. Usually, a user touches the touchscreen of the device with his/her hand or finger in order to interact with the device. Touchscreen devices also exist that accept passive device interaction as input, such as a stylus. Thus, touchscreen devices usually allow interaction through direct touch of a screen. In this way, touchscreen devices allow a user to interact directly with the content of the touchscreen, without the use of an agent (or input) device such as a keyboard or a mouse. Touchscreen devices may perform as stand alone devices, or may require connection with a computer or network to function. Examples of touchscreen devices include tablet personal computers, mobile phones, video game devices, global positioning system (GPS) navigation devices, personal data assistants (PDAs), and the like.

Biometric technologies have also become prevalent in recent years. Biometric technologies include those in which a human or part of a human is uniquely identified through a physical attribute. Fingerprint recognition is an example of a biometric technology that has been used for some time. For example, fingerprinting is widely used by governments worldwide to identify citizens of their respective countries. Fingerprint recognition requires the identification of unique physical characteristics (e.g. ridges) of the fingerprint through the use of various technologies. The identification techniques can range from the utilization of ink to produce an image of the fingerprint on paper to electronic scanning and processing using a computer. Once obtained, the fingerprint is often analyzed using pattern matching algorithms for identification.

SUMMARY

In general, in one aspect, the invention relates to a method for performing a task in a touchscreen device, comprising receiving tactile information from a digit, wherein the tactile information comprises an identifying portion and a touchscreen location of the digit; identifying the digit based on the tactile information; obtaining contextual information from the touchscreen device, wherein the contextual information comprises data describing an execution environment of the touchscreen device; translating, using a controller, a mapping of the tactile information and the contextual information to obtain a task; and performing the task in the touchscreen device, wherein the task performs an action in the execution environment of the touchscreen device.

In general, in one aspect, the invention relates to a system for performing a task in a touchscreen device, comprising a controller; a memory operatively connected to the controller; an input module configured to: receive tactile information from a digit, wherein the tactile information comprises an identifying portion and a touchscreen location of the digit; identify the digit based on the tactile information; a mapping module configured to translate a mapping of the tactile information and contextual information to obtain a task; and a task module configured to obtain the contextual information from the touchscreen device, wherein the contextual information comprises data describing an execution environment of the touchscreen device; and perform the task in the touchscreen device, wherein the task performs an action in the execution environment of the touchscreen device.

In general, in one aspect, the invention relates to a computer readable medium storing instructions for performing a task in a touchscreen device, the instructions executable on a processor and comprising functionality to receive tactile information from a digit, wherein the tactile information comprises an identifying portion and a touchscreen location of the digit; identify the digit based on the tactile information; obtain contextual information from the touchscreen device, wherein the contextual information comprises data describing an execution environment of the touchscreen device; translate a mapping of the tactile information and the contextual information to obtain a task; and perform the task in the touchscreen device, wherein the task performs an action in the execution environment of the touchscreen device.

Other aspects and advantages of the invention will be apparent from the following description and the appended claims.

BRIEF DESCRIPTION OF DRAWINGS

FIGS. 6A, 6B, 6C, 6D, 7A, 7B, 7C, 7D, 7E, 7F, 7G, 8A, 8B, 8C, 8D, 9A, 9B, 9C, 9D, and 10 show examples diagrams of configuring and/or executing the invention in accordance with one or more embodiments of the invention.

DETAILED DESCRIPTION

Figure 1:
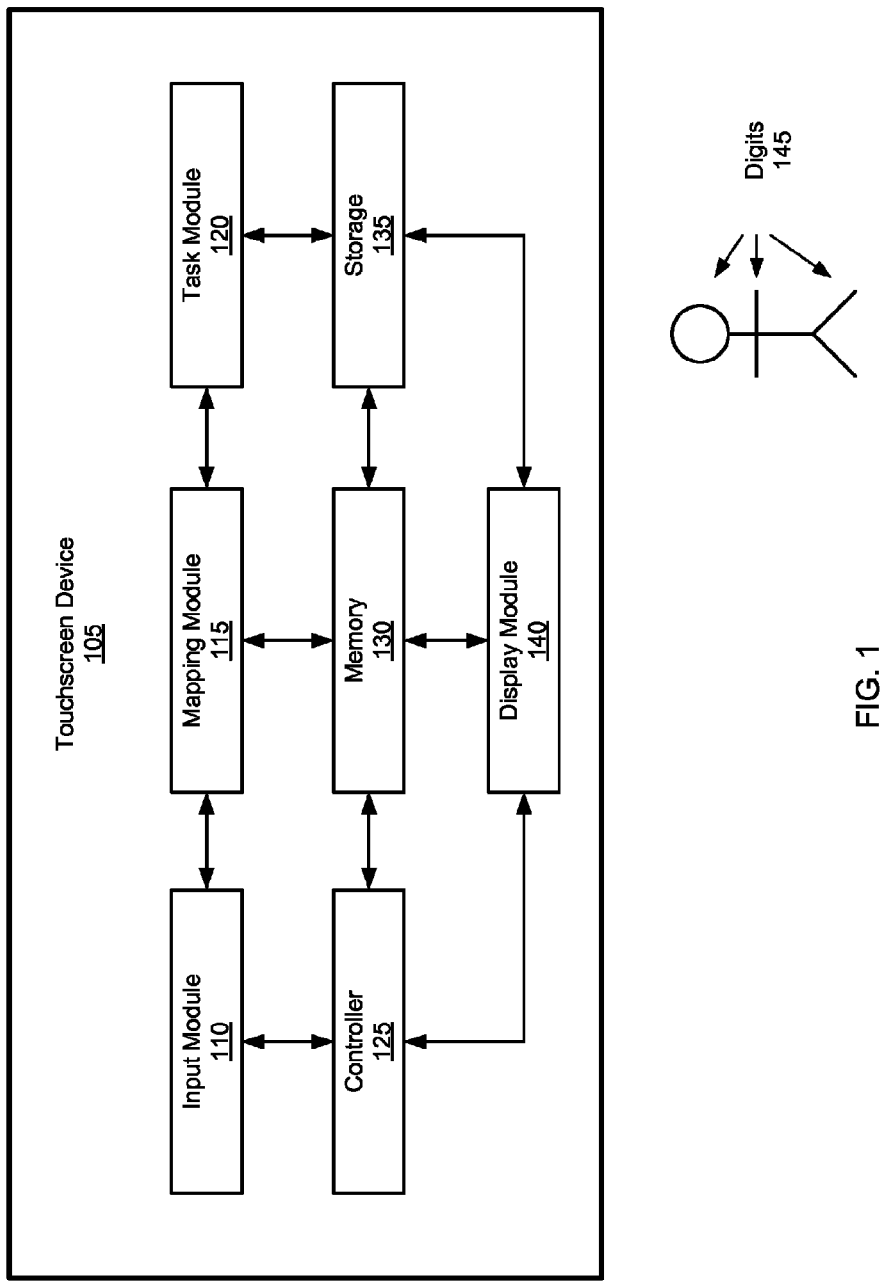
FIGS. 1, 2A, 2B, 3A, 3B, and 3C show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for performing a task in a touchscreen device. In general, embodiments of the invention provide a system and method for performing a task in a touchscreen device by creating a mapping of a task and tactile information and contextual information. In general, embodiments of the invention provide a system and method for performing a task in a touchscreen device through the use of a digit and contextual information.

FIG. 1 shows a touchscreen device (105) in accordance with one or more embodiments of the invention. The touchscreen device (105) may include any device that has functionality to perform tasks based on tactile input received through a touchscreen (e.g. a screen that accepts commands based on tactile information). The touchscreen device (105) may receive input from a digit and translate an identifying portion of that digit into a task that is performed in the touchscreen device (105). The touchscreen device (105) and associated touchscreen may be aware of a specific digit (hence a digit aware touchscreen) based on the tactile input uniquely associated with it. The touchscreen device (105) may be any surface that is able to receive tactile information, and process contextual information, to generate a mapping of such information and tasks, including mobile devices, phones, desktop computers, portable computers, liquid crystal displays, in-car navigation systems, haptic devices, virtual reality devices, ATM's, and the like. Those skilled in the art will appreciate that a digit may include a finger of a hand, a knuckle, an ear, a mouth, an elbow, as well as any other anatomical element. The digits (145) in FIG. 1 demonstrate that a digit may be the head, arm, hand, leg, or feet of a user. Those skilled in the art will also appreciate that the term 'digit' may refer to numerous other anatomical elements not specified. Those skilled in the art will appreciate that a task may be any action that is performed in the touchscreen device (105), including navigation, copying, pasting, scrolling up, scrolling down, scrolling left, scrolling right, accessing menus, and the like. Tasks that may be performed in the touchscreen device (105) are not limited to the aforementioned actions.

As shown in FIG. 1, the touchscreen device (105) includes multiple components such as an input module (110), a mapping module (115), a task module (120), a controller (125), a memory (130), a storage device (135), and a display module (140). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one input module, mapping module, and task module running on a device, as well as more than one controller, memory, storage device, and display module interfacing with those components. Those skilled in the art will appreciate that the touchscreen device (105) may be part of numerous other device categories not described herein.

In one or more embodiments of the invention, the input module (110) accepts input for the touchscreen device (105). The input module may accept input though the touchscreen of the touchscreen device (105), using interface technologies not limited to tactile information, text submission from an associated text input device, voice capture, and user gesture interpretation. Those skilled in the art will appreciate that there may be various other means for the input module (110) to accept input.

In one or more embodiments of the invention, the mapping module (115) contains mappings including an identifying portion of a digit (e.g. represented as a unique signature or number identifying the specific portion of a digit), a location on a touchscreen (e.g. point on the touchscreen represented in Cartesian coordinates, spherical coordinates, or polar coordinates), tasks in a touchscreen device, as well as contextual information (e.g. operating system, application, location). Those skilled in the art will appreciate that an identifying portion of a digit may be a specific spatial location of the digit (e.g. the distal portion of the ventral side of an index finger or the fingerprint of that specific portion of the digit). This information may be contained in a data structure (310), which may be a relational database that stores data entries associated with the touchscreen device (105). The data structure (310) may also be an excel spreadsheet containing data cells associated with the touchscreen device (105). Those skilled in the art will appreciate that the data structure (310) may utilize various other types of technologies and may take numerous other forms.

In one or more embodiments of the invention, the task module (120) obtains contextual information from the touchscreen device (105). The contextual information may describe the execution environment of the touchscreen device (105) (e.g. operating system, application, time of day, geographic location, application location, rate of movement, and the like). The task module (120) also performs tasks in the touchscreen device (105). A task performs an action in the execution environment of the touchscreen device (105).

In one or more embodiments of the invention, the controller (125) carries out the instructions and allows execution of the touchscreen device (105). The controller may be, for instance, a processor, a central processing unit (CPU), a general processing unit (GPU), a network processing unit (NPU), a multi-core processing unit (MPU), as well as numerous other types of controller and processing architectures.

In one or more embodiments of the invention, the memory (130) contains data and information of the touchscreen device (105). The memory (130) may include random access memory (RAM), static random access memory (SRAM), read only memory (ROM), flash memory, volatile memory, non-volatile memory, as well as numerous other types of memory implemented in various other architectures.

In one or more embodiments of the invention, the storage device (135) may contain data associated with the touchscreen device (105). The storage device (135) may perform at a slower rate of data transfer than other forms of storage, such as the memory (130). The storage device (135) may include magnetic discs, optical discs, hard discs, as well as numerous other types and architectures of storage devices. Those skilled in the art will appreciate that the storage device (135) may be implemented with many technologies not described.

In one or more embodiments of the invention, the display module (140) may display information associated with the touchscreen device (105). The display module (140) may display information on a touchscreen of the touchscreen device (105), in a web browser, an application window, and other formats. The display module (140) may display information in these display technologies to be viewed by a user of the touchscreen device (105). The display module (140) may also display information in standard web elements, including video, audio, and text. Those skilled in the art will appreciate that there may be various other display technologies used by and to view information through the display module (140).

Figure 2A:
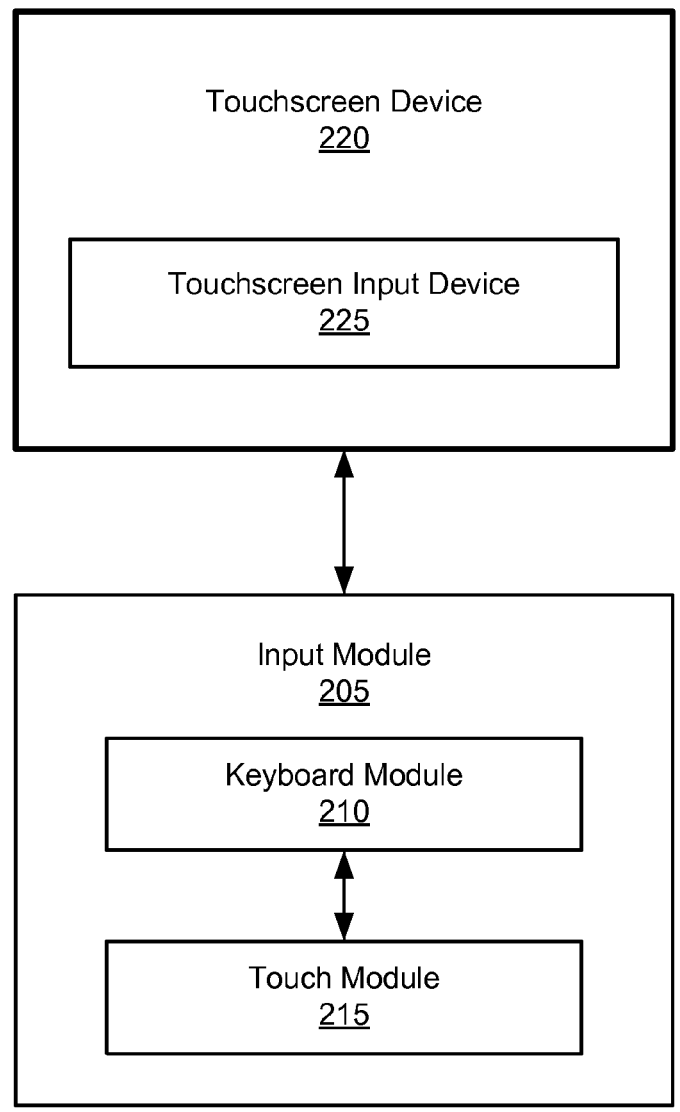

FIG. 2A shows the input module (205) in accordance with one or more embodiments of the invention. As seen in FIG. 2A, the input module (205) may contain a keyboard module (210) and a touch module (215). The input module (205) may allow the touchscreen device (220) to receive input in multiple formats, such as from a touchscreen input device (225). The keyboard module (210) may allow for input received from the touchscreen input device (225) (e.g. a keyboard, microphone, camera, or other input mechanism). Those skilled in the art will appreciate that input may be received in numerous other forms beyond a touchscreen input device (225).

Figure 2B:
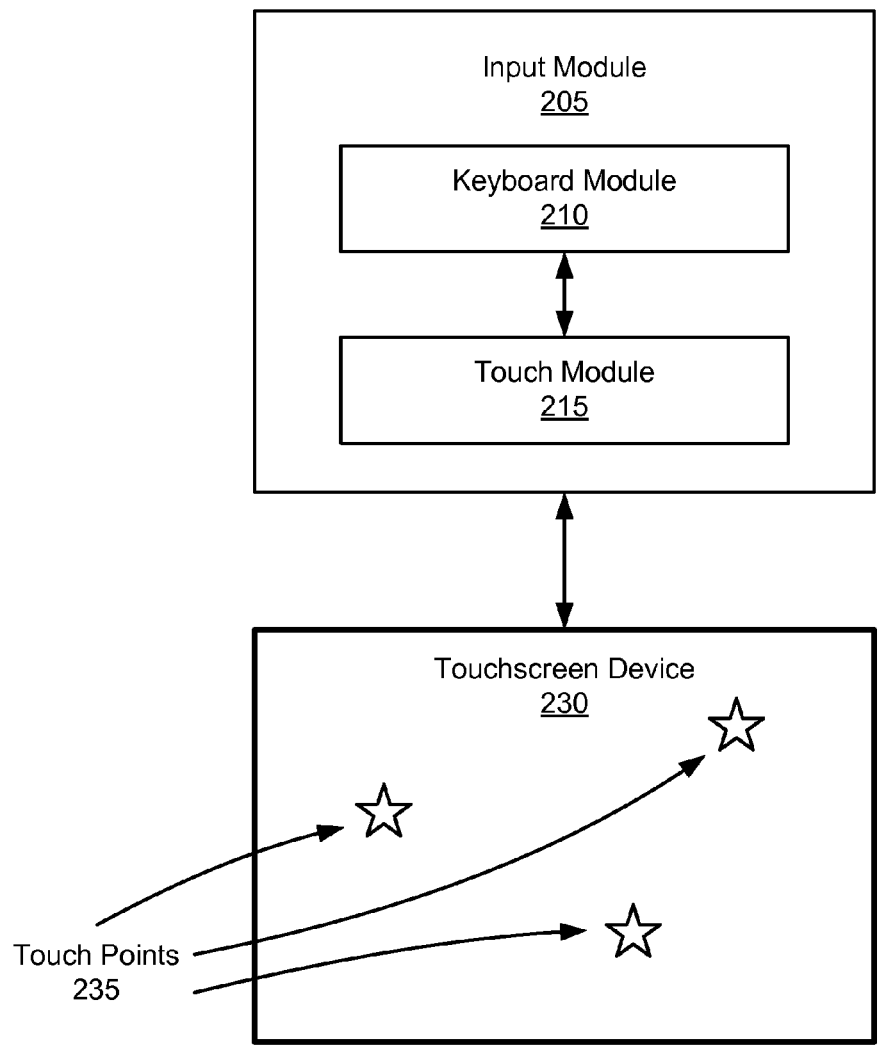

FIG. 2B shows the input module (205) in accordance with one or more embodiments of the invention. As seen in FIG. 2B, the input module (205) may contain a keyboard module (210) and a touch module (215). The input module (205) may allow the touchscreen device (230) to receive input in multiple formats, such as from touch points (235). The touch module (215) may allow for input in the form of touch points (235). Touch points (235) are points where tactile information has been received on a touchscreen (e.g. where a digit has touched the touchscreen), and may be located anywhere on the surface of the touchscreen of the touchscreen device (230). Those skilled in the art will appreciate that input may be received in numerous other forms beyond touch points (235).

Figures 3A, 3B, 3C:
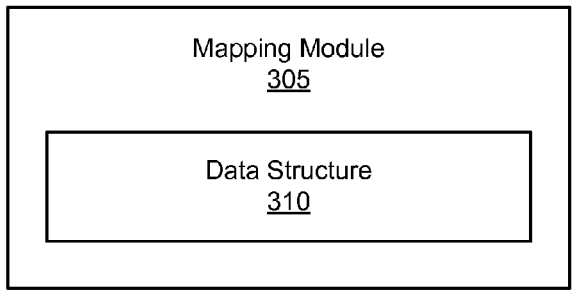

FIG. 3A shows the mapping module (305) in accordance with one or more embodiments of the invention. As seen in FIG. 3A, the mapping module (305) may include a data structure (310) that contains data (e.g. an identifying portion of a digit, a location on a touchscreen, an operating system, an application, a task) relating to the touchscreen device (105) (i.e. a mapping between tactile information of a digit, contextual information of the touchscreen device (105), and a task).

FIG. 3B shows the data structure (310) at time instance X. At time instance X, the data structure (310) may contain two entries relating to two distinct identifying portions of two digits. The identifying portions of the two digits may be represented as numeric strings (e.g. a ten number long integer, such as 3037465017). The locations on the touchscreen may be represented as Cartesian coordinates (e.g. an x-y coordinate corresponding to a specific spatial point of the touchscreen, or an x-y coordinate range corresponding to a specific area of the touchscreen). There may be more than one operating system loaded onto the touchscreen device (105) (e.g. OS A, OS B), and multiple applications (e.g. browser, image viewer) running concurrently on the multiple operating systems in the touchscreen device (105). Numerous tasks (e.g. actions) may be performed in each of these applications and operating systems (e.g. scroll up, enlarge).

FIG. 3C shows the data structure (310) at time instance Y (i.e. a later time than time instance X). At time instance Y, the second entry (i.e. identifying portion 7625843590) from data structure (310) at time instance X is removed, corresponding to a purge of this data from the data structure (310), and two new entries are added (i.e. identifying portions 5850272131 and 7589261890). The first entry in the data structure (310) for identifying portion 3037465017 is modified from the previous entry at time instance X as the location has been changed from 25.107 to 59.231. This corresponds with a modification of the coordinate point of the touchscreen associated with identifying portion 3037465017. Identifying portion 3037465017 is still associated with OS A, however the application and task have been modified from browser and scroll up to SMS and copy, respectively. This corresponds to a reprogramming of the mapping between the digit (e.g. the identifying portion) and the task and contextual information (e.g. application). Further, identifying portion 7589261890 is associated with location 681.38, as well as the same operating system, application, and task (i.e. OS A, SMS, and copy) as identifying portion 3037465017. This indicates that there are two identifying portions (i.e. 3037465017 and 7589261890) that, when touching the touchscreen of the touchscreen device (105), may perform the same task in the same application, in the same operating system, from different locations on the touchscreen. Those skilled in the art will appreciate that there may be many such combinations of identifying portions, locations, operating systems, applications, and tasks.

Figure 4:
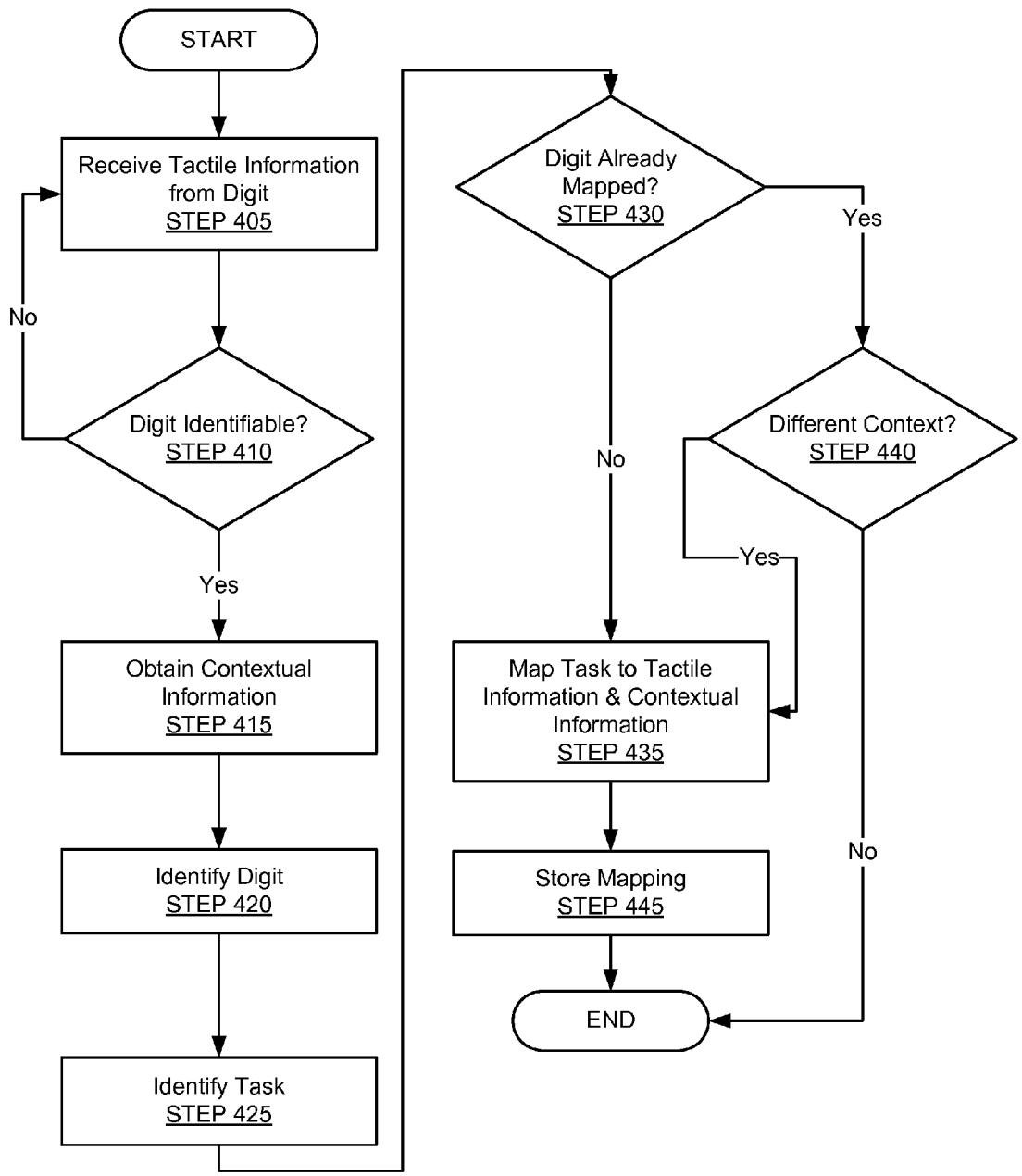
FIGS. 4 and 5 show flowcharts in accordance with one or more embodiments of the invention.

FIG. 4 shows a flowchart in accordance with one or more embodiments of the invention. The process shown in FIG. 4 may be used, for example, with the touchscreen device (105), to configure the touchscreen device (105), and to generate mappings of tactile information and contextual information associated with tasks. Those skilled in the art will appreciate that the sequence of steps shown in FIG. 4 may differ among embodiments of the invention, and that one or more of the steps may be optional.

In STEP 405, tactile information may be received from a digit. The tactile information may be any information associated with a digit that uniquely identifies the digit (e.g. ridge points of the digit, a fingerprint, the amount of pressure the digit applies to the touchscreen, the geometric signature of the digit, unique characteristics of the digit, and the like). The tactile information may be received from the digit by numerous mechanisms. For example, a scanner may obtain the tactile information from the digit and transmit that information to the touchscreen device (105). Those skilled in the art will appreciate that the digit may be a finger, a knuckle, any other part of a hand, an ear, a mouth, a nose, a foot, as well as numerous other anatomical structures. Those skilled in the art will also appreciate that the digit may also be a glove worn by a hand with unique digital signatures assigned to each finger. Further, the tactile information may be the digital signature associated with the digit, the signature received from a haptics device worn by a user, or other technology that interfaces the touchscreen device (105) with a user through touch, force, vibrations, and/or motions of the user. In addition, tactile information may include gestures performed by the digit of a user, such as the tracing of a geometric shapes on the touchscreen (e.g. circles, squares, numbers, letters, and the like). The length of time in which tactile information is received (e.g. the length of the touch received) or the order and/or pattern of multi touch sequences (e.g. a three tap sequence) may also be interpreted by the touchscreen device (105). Those skilled in the art will appreciate that there will be numerous technologies and interfaces through which the tactile information may be received from the digit.

In STEP 410, it is determined whether the digit is identifiable. If the digit is found to be unidentifiable, the process proceeds back to STEP 405 to re-receive tactile information from the digit. If the digit is found to be identifiable, then the process proceeds to STEP 415.

In STEP 415, contextual information is obtained. The contextual information may be obtained from the touchscreen device (105). The contextual information may be any information about the executing environment of the touchscreen device (105), including the operating system of the touchscreen device (105), applications running on the touchscreen device (105), a particular application to be associated with the tactile information received in STEP 405, network settings of the touchscreen device (105), interface options of the touchscreen device (105), the global positioning system (GPS) coordinates of the touchscreen device (105), the physical orientation of the touchscreen device (105), menu options of the touchscreen device (105), and the like. Those skilled in the art will appreciate that there may be numerous other types of contextual information associated with the touchscreen device (105).

In STEP 420, the digit is identified. The digit may be identified by the touchscreen device (105). The digit may be identified, for example, by tactile information describing the digit, received electronically (e.g. via email). The identification of the digit may associate the identifying portion of the digit with the digit in the touchscreen device (105). Once the digit has been identified, the touchscreen of the touchscreen device (105) may recognize the digit when it touches the touchscreen. Those skilled in the art will appreciate that there may be numerous mechanisms by which the digit may be identified.

In STEP 425, a task is identified. The task may be identified from and/or by the touchscreen device (105). The task may be any action performed in the executable environment of the touchscreen device (105), including copy, paste, play, scroll up, scroll down, scroll left, scroll right, enlarge, minimize, select, find, save, identify, and the like. One embodiment of a task may be the manipulation of a file system with various digits. For example, in a traditional file system, drop down menus appear based on user selections of menu types (e.g. file, edit, insert, and the like). In the touchscreen device (105), various tasks associated with drop down menu selections may be associated with varying digits. For instance, the file menu type may be associated with an index digit, such that whenever a user touches the touchscreen with the index digit, in whatever location on the touchscreen, the file menu type is activated. Concurrent to this mapping, there may be another mapping of the edit menu type with a thumb digit, such that whenever a user touches the touchscreen with the thumb digit, in whatever location on the touchscreen, the edit menu type is selected. Further, there may be third mapping associated with a pinky digit, such that whenever a user touches the touchscreen with the pinky digit, in whatever location on the touchscreen and after having activated one of the previously described menu types, the user is able to scroll through the sub menu items of the activated menu type. Those skilled in the art will appreciate that there may be numerous other such applicable tasks not described.

In STEP 430, a determination is made whether the digit has been mapped yet or not. If the digit has already been mapped, the process proceeds to STEP 440. If the digit has not yet been mapped, then the process proceeds to STEP 435.

In STEP 435, the task is mapped to tactile information and contextual information. This mapping uniquely associates the task with the tactile information and the contextual information. The mapping may be generated by the mapping module (115) of the touchscreen device (105), in a data structure similar to data structure (310).

In STEP 440, it is determined whether the contextual information of the execution environment of the touchscreen device (105) is different than the contextual information in the existing mapping. If the contextual information of the execution environment of the touchscreen device (105) is different than the contextual information in the existing mapping, then the process proceeds to generate the mapping of the task and the tactile and contextual information in STEP 435. If the contextual information of the execution environment of the touchscreen device (105) is the same as the contextual information in the existing mapping, then the process proceeds to end, because each mapping is expected to be a unique association.

In STEP 445, the mapping is stored. The mapping may be stored by the mapping module (115) of the touchscreen device (105). The mapping may be stored in a data structure similar to data structure (310). The data structure may be located in the mapping module (115), the memory (130), or storage device (135) of the touchscreen device (105). Those skilled in the art will appreciate that the storage of the mapping may be accomplished in numerous locations by various means.

Figure 5:
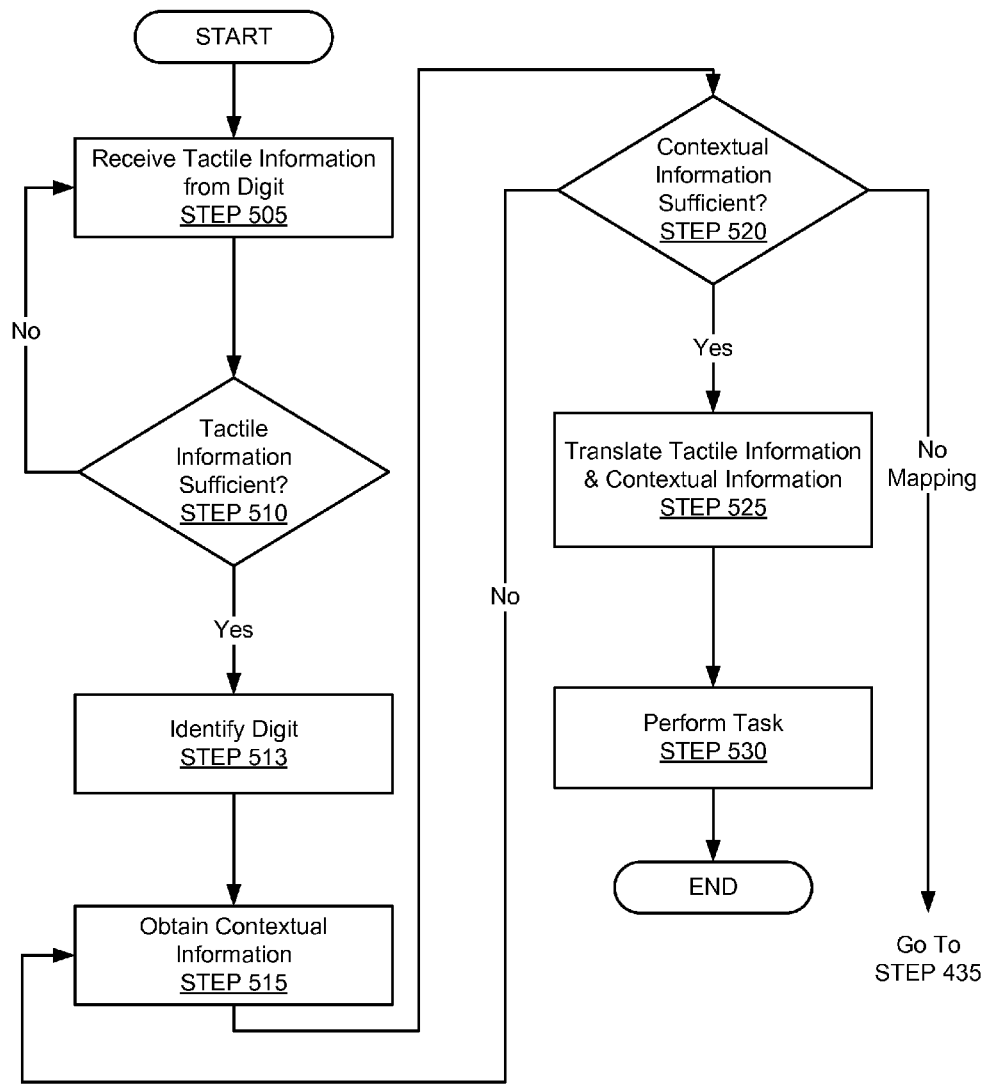

FIG. 5 shows an example in accordance with one or more embodiments of the invention. The process shown in FIG. 5 may be used, for example, with the touchscreen device (105), to perform a task when tactile information is received from a digit on a touchscreen of touchscreen device (105). Those skilled in the art will appreciate that the sequence of steps shown in FIG. 5 may differ among embodiments of the invention, and that one or more of the steps may be optional.

In STEP 505, tactile information is received from a digit. The tactile information may be in numerous forms. Please refer to the description of STEP 405 for more detail on tactile information.

In STEP 510, it is determined whether the tactile information received from the digit in STEP 505 is sufficient. If the tactile information received from the digit is sufficient to proceed, then the process proceeds to STEP 513. If the tactile information received from the digit is not sufficient to proceed, then the process proceeds back to STEP 505 in order to re-receive tactile information from the digit that is sufficient. Those skilled in the art will appreciate that when the process proceeds back to STEP 505, if the digit does not provide further tactile information, the process may end, and if a different digit provides sufficient tactile information, then the process may proceed to STEP 513.

In STEP 513, the digit is identified. Please refer to the description of STEP 420 for more detail regarding an embodiment of performing the identification of the digit.

In STEP 515, contextual information is obtained. There may be various forms of contextual information. Please refer to the description of STEP 415 for more detail regarding an embodiment of contextual information.

In STEP 520, a determination is made whether the contextual information obtained in STEP 515 is sufficient. If the contextual information obtained is sufficient, then the process proceeds to STEP 525. If the contextual information is not sufficient, then the process proceeds back to STEP 515 to re-obtain the contextual information. If no mapping exists in the touchscreen device (105), then the process may proceed to STEP 435 to generate a mapping of the task and the tactile information and the contextual information.

In STEP 525, the tactile information and contextual information are translated to obtain a task. The translation may be of the mapping generated in STEP 435.

In STEP 530, the task is performed. As discussed in STEP 425, the task may be performed in the executable environment of the touchscreen device (105). Please refer to the description of STEP 425 for more details of the different types of actions that may be associated with the task.

FIGS. 6A, 6B, 6C, and 6D show examples in accordance with one or more embodiments of the invention. The process shown in FIGS. 6A, 6B, 6C, and 6D may be used, for example, with the touchscreen device (610), to configure the touchscreen device (610) to recognize tactile information from specific digits, and to perform specific tasks associated with those digits when tactile information is received from those digits. Those skilled in the art will appreciate that the sequence of steps shown in FIGS. 6A, 6B, 6C, and 6D may differ among embodiments of the invention, and that one or more of the steps may be optional.

Figure 6B:
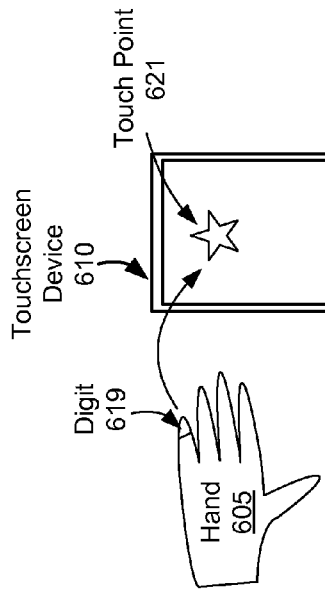
Figure 6D:
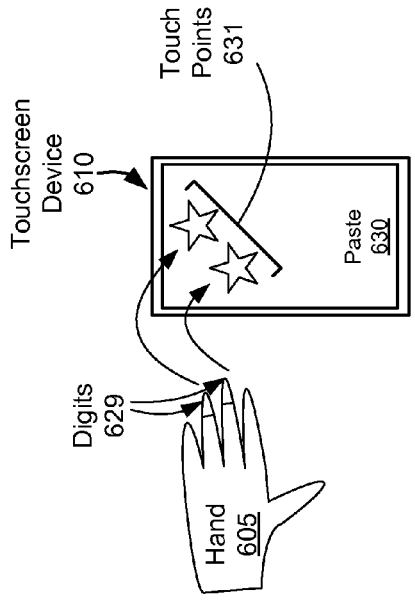
Figure 6A:
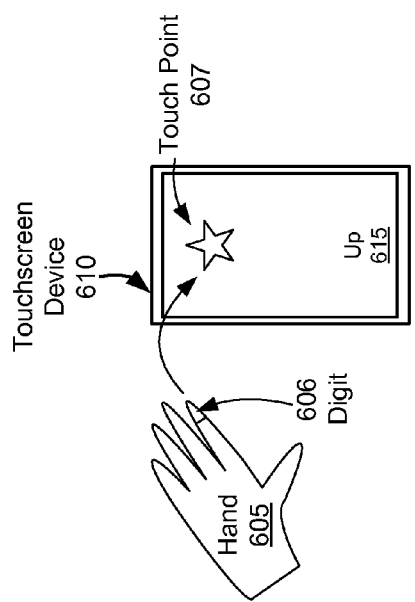

FIG. 6A shows the association of a task (e.g. with functionality to scroll up) with a digit (606). This association may occur as part of the process described in FIG. 4. The digit (606) from hand (605) touches the touchscreen of touchscreen device (610) at the touch point (607). When the digit (606) touches the touch point (607), the touchscreen device (610) may request that the user choose a task. Concurrently, the touchscreen device (610) may profile the current execution environment in order to obtain the contextual information to associate with the tactile information received from digit (606). The user may then choose a task to associate with the digit (606) (and tactile information as well as contextual information). In FIG. 6A, the task is the action of scrolling up (615). Those skilled in the art will appreciate that the same digit and tactile information may be associated with differing tasks based on contextual information. For example, digit (606) may be configured to perform the scroll up task in context A, and may perform a scroll down task in context B. Those skilled in the art will appreciate that there will be various other such means for configuring expanded functionality.

FIG. 6B shows the association of a task (e.g. with functionality to scroll down) with a digit (619), distinct from digit (606). The digit (619) (which may be from hand (605)) touches the touchscreen of touchscreen device (610) at the touch point (621). This association again may occur as part of the process described in FIG. 4. When the digit (619) touches the touch point (621), the touchscreen device (610) may request that the user choose a task. Concurrently, the touchscreen device (610) may profile the current execution environment in order to obtain the contextual information to associate with the tactile information received from digit (619). The user may then choose a task to associate with the digit (619) (and tactile information as well as contextual information). In FIG. 6B, the task is the action of scrolling down (620). Those skilled in the art will appreciate that this example demonstrates that two distinct digits (e.g. digit (606) and digit (619)) may be associated with two distinct tasks (e.g. scroll up (615) and scroll down (620)).

Figure 6C:
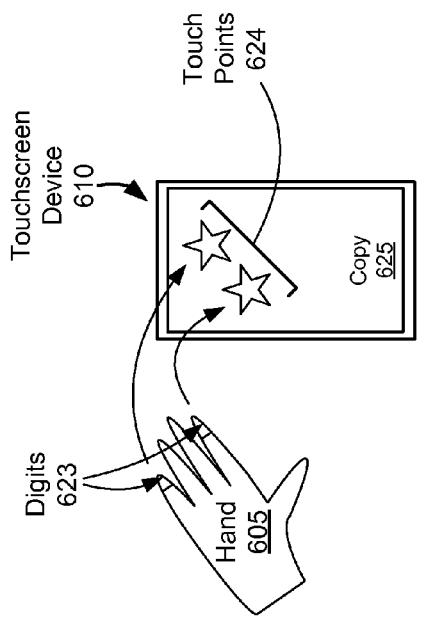

FIG. 6C shows the association of a task (e.g. with functionality to copy) with two digits (623). The digits (623) may again be from hand (605), and touch the touchscreen of touchscreen device (610) at the touch points (624). When the digits (623) touch the touch points (624), the touchscreen device (610) may request that the user choose a task to associate with the digits (623). The touchscreen device (610) may also identify the current execution environment in order to obtain the contextual information to associate with the tactile information received from digits (623). The user may then choose a task to associate with the digits (623) (and tactile information and contextual information). In FIG. 6C, the task is the action of copying (625).

FIG. 6D shows the association of a task (e.g. with functionality to paste) with two digits (629), distinct from digits (623). The digits (629) may again be from hand (605), and touch the touchscreen of touchscreen device (610) at the touch points (631). The touch points (631) may be distinct from or the same as touch points (607), (621), and (624). When the digits (629) touch the touch points (631), the touchscreen device (610) may request that the user choose a task to associate with the digits (629). The touchscreen device (610) may also identify the current execution environment in order to obtain the contextual information to associate with the tactile information received from digits (629). The user may then choose a task to associate with the digits (629) (and tactile information and contextual information). Those skilled in the art will appreciate that the user may utilize numerous mechanisms to choose the task to associate with the digits (629) and the tactile information they provide, including voice input, further tactile information, motion (tilt and angle of the touchscreen device (610)'s spatial orientation), and the like. In FIG. 6D, the task is the action of pasting (630).

FIGS. 7A, 7B, 7C, 7D, 7E, 7F, and 7G show examples in accordance with one or more embodiments of the invention. The examples shown in FIGS. 7A, 7B, 7C, 7D, 7E, 7F, and 7G may be used, for example, with the touchscreen device (705), to perform tasks associated with digits in the touchscreen of the touchscreen device (705). Those skilled in the art will appreciate that the sequence of steps shown in FIGS. 7A, 7B, 7C, 7D, 7E, 7F, and 7G may differ among embodiments of the invention, and that one or more of the steps may be optional.

FIG. 7A shows a touchscreen device (705) with an object A (710) displayed in the touchscreen in an equilibrium position. The equilibrium position may be regarded as a position on the touchscreen of touchscreen device (705) in which object A (710) is initially positioned when an application containing object A (710) commences. For example, if the application is a newsfeed, and object A (710) is the text of a news headline, the equilibrium position of object A (710) may be at the top of the touchscreen. Alternatively, if the application is a picture viewer, and object A (710) is a picture, then the equilibrium position of object A (710) may be the center of the touchscreen. Those skilled in the art will appreciate that there may be numerous equilibrium configurations for various applications.

FIG. 7B shows a hand (715) with digit (716) touching the touchscreen of touchscreen device (105) at touch point (717). The digit (716) (and therefore the tactile information associated with the digit (716)) may be associated with the task that performs scrolling up (720). An example of the configuration of this mapping may be seen in FIG. 6A. When digit (716) touches the touchscreen of the touchscreen device (705) at the touch point (717), the touchscreen device (705) performs the task associated with the digit (716) (i.e. scrolling the screen of the touchscreen up). This may be seen by the altered position of object A (710) in FIG. 7B relative to the position of object A (710) in FIG. 7A. For example, if a GPS map application is currently displayed in the touchscreen, then a user may move the map up in the touchscreen by touching the touchscreen at touch point (717) with digit (716).

FIG. 7C shows the touchscreen device (705) with the object A (710) again displayed in the touchscreen in an equilibrium position. For more details about the equilibrium position, please refer to the description of FIG. 7A.

FIG. 7D shows hand (715) with another digit (723), distinct from the digit (716), touching the touchscreen of touchscreen device (705) at touch point (724). The digit (723) (and the tactile information associated with digit (723)) may be associated with the task that performs scrolling down (725). An example of the configuration of this mapping may be seen in FIG. 6B. When digit (723) touches the touchscreen of the touchscreen device (705) at the touch point (724), the touchscreen device (705) performs the task associated with the digit (723) (i.e. scrolling the screen of the touchscreen down). This may be seen by the altered position of object A (710) in FIG. 7D relative to the position of object A (710) in FIG. 7C (in equilibrium position). For example, if the GPS map application is displayed in the touchscreen, then the user may move the map down in the touchscreen by touching the touchscreen at touch point (724) with digit (723).

FIG. 7E shows the touchscreen device (705) with the object A (710) again displayed in the touchscreen in another equilibrium position. Those skilled in the art will appreciate that the equilibrium position may differ from the equilibrium position shown in FIGS. 7A and 7C. For more details about the equilibrium position, please refer to the description of FIG. 7A.

FIG. 7F shows hand (715) with two digits (729) performing a copy task (730) on object A (710). The digits (729) (and the tactile information associated with the digits (729)) may be associated with the task that performs copying (730). An example of the configuration of this mapping may be seen in FIG. 6C. When digits (729) touch the touchscreen of the touchscreen device (705) at the position of object A (710) in FIG. 7F, the touchscreen device (705) performs the task associated with the digits (729) (i.e. copying object A (710)). Copying object A (710) may store a copy of the object in memory (130) or storage device (135) to be used as content or manipulated at a future time.

FIG. 7G shows hand (715) with two digits (734), distinct from the two digits (729) that performed the copy task (730), performing a paste task (735) for object A (710). An example of the configuration of this mapping may be seen in FIG. 6D. When digits (734) touch the touchscreen of the touchscreen device (705) at the new position of object A (710) in FIG. 7G, the touchscreen device (705) performs the task associated with the digits (734) (i.e. pasting object A (710)). Pasting object A (710) may duplicate the stored version of the object from memory (130) or storage device (135) at the new position in the touchscreen.

FIGS. 8A, 8B, 8C, and 8D show examples in accordance with one or more embodiments of the invention. The examples shown in FIGS. 8A, 8B, 8C, and 8D may be used, for example, with the touchscreen device (805), to demonstrate a digit performing two distinct tasks based on the context. Those skilled in the art will appreciate that the sequence of steps shown in FIGS. 8A, 8B, 8C, and 8D may differ among embodiments of the invention, and that one or more of the steps may be optional.

FIG. 8A shows an object C (815) in an application A (810) displayed on the touchscreen of a touchscreen device (805) in an equilibrium state. For more details about the equilibrium position, please refer to the description of FIG. 7A.

FIG. 8B shows a digit (821) (e.g. a knuckle) of a hand (820) touching a touch point (822) to perform a task in application A (810). The configuration of this mapping may be similar to that shown in FIG. 6A, except that a different digit (i.e. digit (821)), tactile information, and contextual information may have been associated with the task. When digit (821) touches touch point (822), the scroll up (825) task is performed in application A (810). This may be seen by the altered position of object C (815) in FIG. 8B relative to the position of object C (815) in FIG. 8A (in equilibrium position).

FIG. 8C shows an object D (835) in an application B (830) displayed on the touchscreen of a touchscreen device (805) in an equilibrium state. For more details about the equilibrium position, please refer to the description of FIG. 7A.

FIG. 8D shows the digit (821) of hand (820) touching a touch point (839) to perform a task in application B (830). The configuration of this mapping may be similar to that shown in FIG. 6B, except that a different digit (i.e. digit (821)), tactile information, and contextual information may have been associated with the task. When digit (821) touches touch point (839), the scroll down (840) task is performed in application B (830). This may be seen by the altered position of object D (835) in FIG. 8D relative to the position of object D (835) in FIG. 8C (in equilibrium position). Those skilled in the art will appreciate that the same digit (821) has been used to perform two different tasks in FIGS. 8B and 8D, as the context differs between the two. In FIG. 8B, application A (810) is part of the executing environment, and task (825) is performed in application A (810). In FIG. 8D however, application B (830) is part of the executing environment (and also part of the contextual information), and task (840) is performed in application B (830). Because different contextual information exists between FIGS. 8B and 8D (i.e. the applications A (810) and B (830)), the same digit (821) performs different tasks (scrolling up (825) and scrolling down (840)), dependant upon the context. Those skilled in the art will appreciate that there may be various other contextual differences that may enable different tasks to be associated with the same digits (e.g. operating systems, GPS coordinates, time of day, tilt and angle of the touchscreen device (805), mode, and the like).

FIGS. 9A, 9B, 9C, and 9D show examples in accordance with one or more embodiments of the invention. The examples shown in FIGS. 9A, 9B, 9C, and 9D may be used, for example, with the touchscreen device (105), to demonstrate the configuration of mappings between digits and tasks (or functions) and contextual information. Those skilled in the art will appreciate that the sequence of steps shown in FIGS. 9A, 9B, 9C, and 9D may differ among embodiments of the invention, and that one or more of the steps may be optional.

Figure 9A:
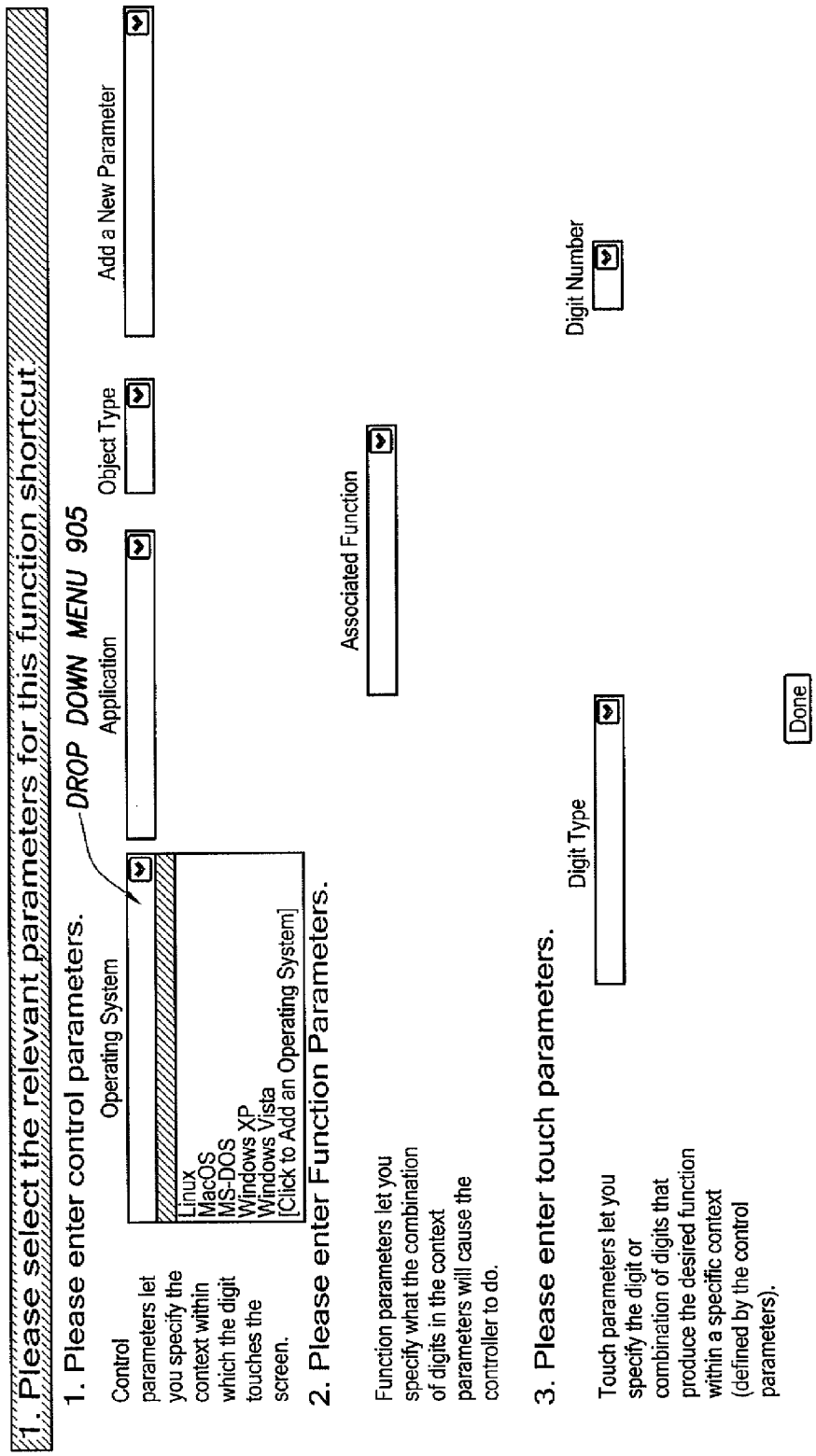

FIG. 9A shows a configuration screen with the selection of an operating system control parameter drop down menu (905). The configuration screen may be used to generate the mapping of tactile information, contextual information, and task discussed in STEP 435. The configuration screen may include control parameters (e.g. contextual information such as operating system, application, object type, user configured parameters), function parameters (i.e. tasks), and touch parameters (e.g. tactile information such as digit type and digit number). The operating system drop down menu (905) may specify an operating system to use as contextual information. Those skilled in the art will appreciate that the configuration screen may be used as an alternative means to generate the mapping discussed in STEP 435, and that the mapping may be setup and configured by a user. For example, a user may select the tactile information, contextual information, and task(s) to associate together in the mapping through such an interface (on the touchscreen of the touchscreen device (105) or in a remote computer), and generate the mapping based on such input. Those skilled in the art will also appreciate that the configuration screen may include various other types of contextual information, tasks, and tactile information not shown.

Figure 9B:
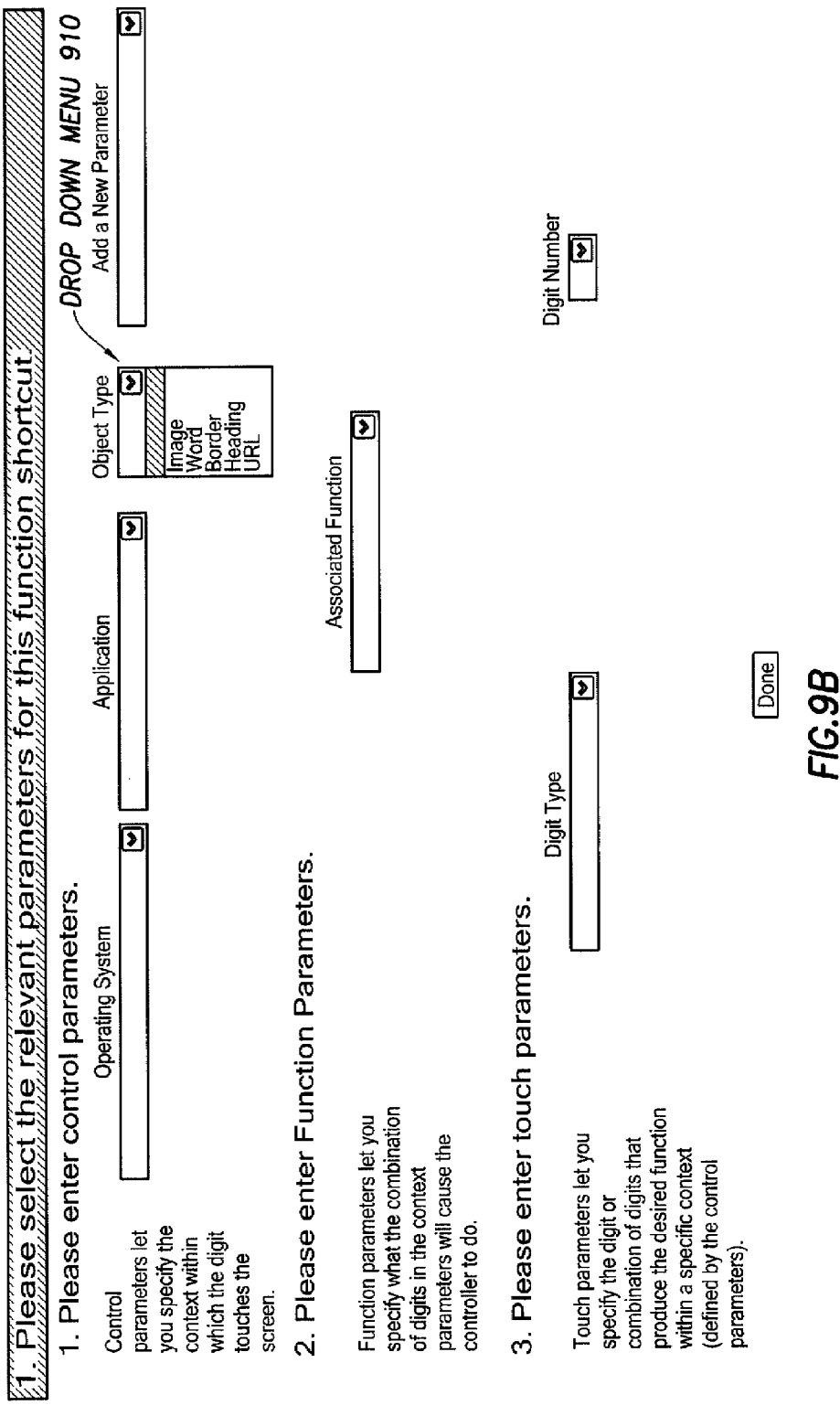

FIG. 9B shows a configuration screen with the selection of an object type control parameter drop down menu (910). The object type drop down menu (910) may include various types such as images, words, borders, headings, and URLs. Object types may describe objects that may be associated with tactile information, contextual information, and tasks. Those skilled in the art will appreciate that there will be various other object types available for selection, as well as user defined object types.

Figure 9C:
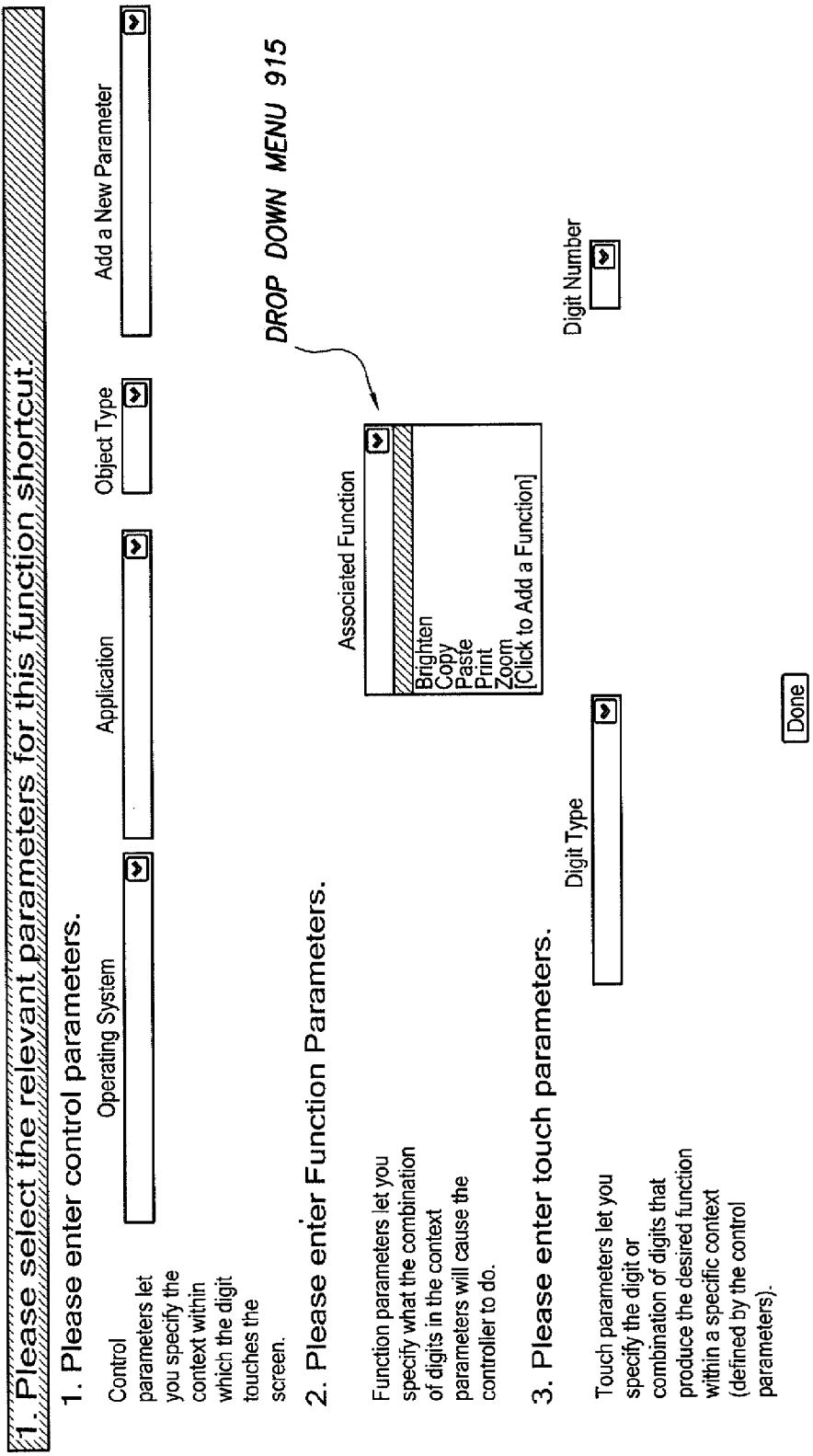

FIG. 9C shows a configuration screen with the selection of a function parameter drop down menu (915) for an associated function. The associated function drop down menu (915) may include various tasks such as brighten, copy, paste, print, and zoom. The functions (e.g. tasks) described by the associated function drop down menu (915) may also include sequential or combination tasks, such as a copy followed by a paste, a minimize operation followed by a close, and the like. Further, timing information may be associated with the tasks, including the association of a task (e.g. a scroll down by one line) if a touch is performed by a user for a certain time period (e.g. 1 second), and association of the a similar task (e.g. scroll down by half a page) if a touch is performed by a user for a different amount of time (e.g. 2 seconds). Those skilled in the art will appreciate that various other tasks (e.g. functions) may be defined by a user.

Figure 9D:
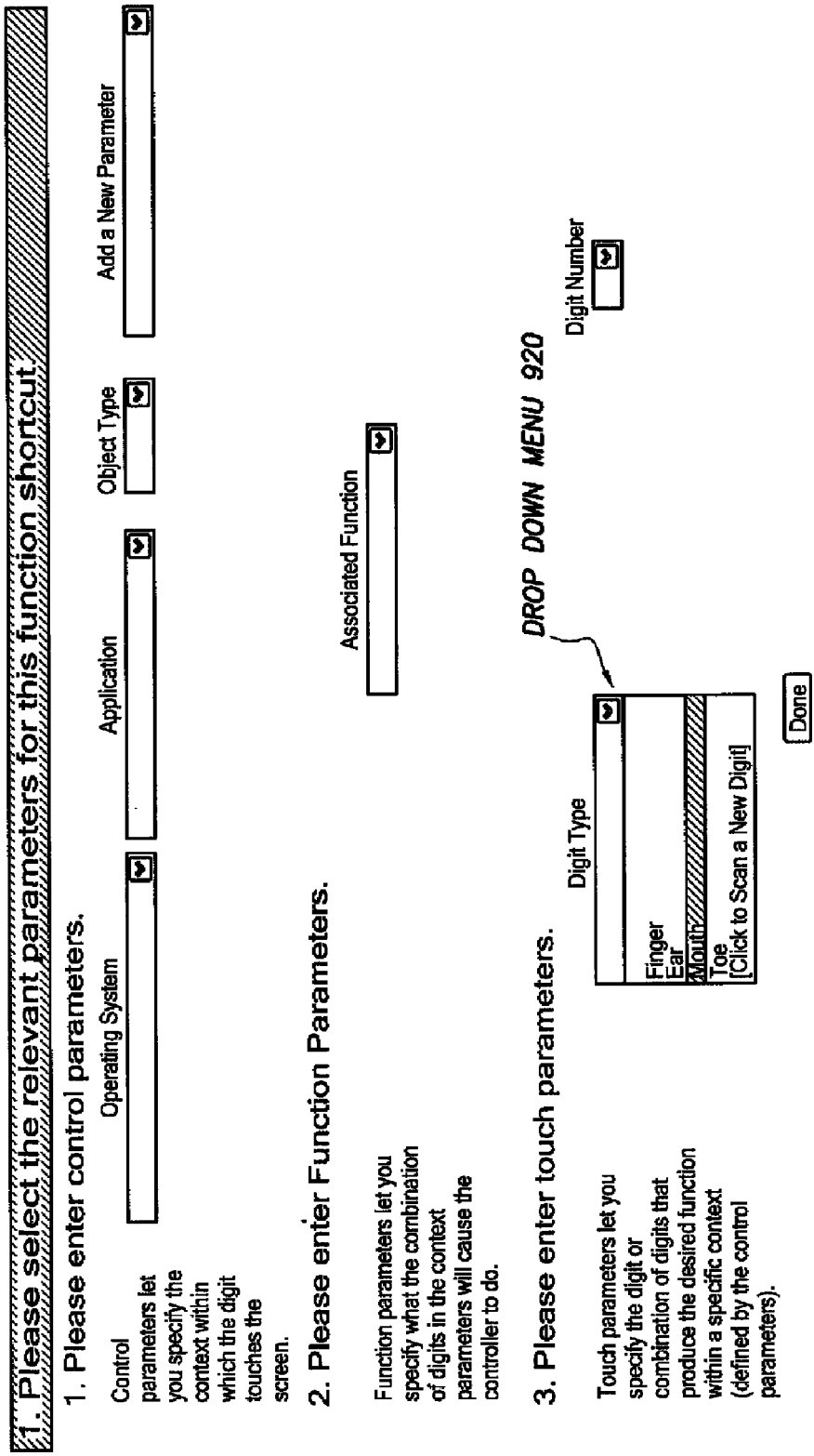

FIG. 9D shows a configuration screen with the selection of a digit type touch parameter drop down menu (920). The digit type parameter drop down menu (920) may include various digits such as fingers, ears, mouth, lips, and toes. Those skilled in the art will appreciate that other digits may be scanned by a user.

FIG. 10 shows an example in accordance with one or more embodiments of the invention. The example shown in FIG. 10 may be used, for example, to perform a task in the touchscreen of a touchscreen device (e.g. ATM (1005)). Those skilled in the art will appreciate that the sequence of steps shown in FIG. 10 may differ among embodiments of the invention, and that one or more of the steps may be optional.

FIG. 10 shows a touchscreen device (i.e. ATM (1005)), and various tasks that may be performed in the ATM (1005), such as withdrawing funds, depositing funds, checking a balance, calling a representative, performing a transfer, and setting and resetting tactile command settings. The tasks to be performed may vary according to the digit used to touch the touchscreen (or provide tactile information to the touchscreen). For example, withdrawing funds may be triggered by tactile information associated with a thumb digit, and making a deposit may be triggered by tactile information associated with an index digit. Further, combinations of digits may perform different tasks than the individual digits of the combination alone. For example, in order to perform a transfer, a user may provide tactile information associated with both a middle digit and a pinky digit. Those skilled in the art will appreciate that different locations on the touchscreen at which tactile information is received may provide for differing contexts, and therefore may trigger different tasks. For example, a middle digit, when touching the top portion of the touchscreen, may access the balance of a checking account. The same middle digit, when touching the bottom portion of the touchscreen, may access the balance of a savings account. Those skilled in the art will appreciate that there exist various other ways of interfacing with the touchscreen device (1005) through the use of tactile information and contextual information.

The invention may be implemented using virtually any type of computer technology regardless of the platform being used. For example, as shown in FIG. 1, the touchscreen device (105) includes a controller (125) (e.g. a processor), associated memory (130), storage device (135), and numerous other elements and functionalities typical of today's computers (not shown). The touchscreen device (105) may also include input means, such as a touchscreen input device (225) (e.g. a virtual keyboard), and output means, such as a touchscreen. The touchscreen device (105) may be connected to a local area network (LAN) or a wide area network (e.g., the Internet) (not shown) via a network interface connection or a wireless connection (not shown). Those skilled in the art will appreciate that these input and output means may take other forms.

Further, those skilled in the art will appreciate that one or more elements of the aforementioned touchscreen device (105) may be located at a remote location and connected to the other elements over a network. Further, the invention may be implemented on a distributed system having a plurality of nodes, where each portion of the invention (e.g., object store layer, communication layer, logic layer, and the like) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a task in a touchscreen device, comprising:
   receiving tactile information from a digit, wherein the tactile information comprises an identifying portion and a touchscreen location of the digit;
   identifying the digit based on the tactile information;
   obtaining contextual information from the touchscreen device,
      wherein the contextual information comprises data describing an execution environment of the touchscreen device, and
      wherein the contextual information comprises a first geographic location of the touchscreen device;
   translating, using a controller, a mapping of the tactile information and the contextual information to obtain a task;
   performing the task at the first geographic location of the touchscreen device, wherein the task performs an action in the execution environment of the touchscreen device;
   obtaining alternative contextual information from the touchscreen device, wherein the alternative contextual information comprises a second geographic location;
   translating, using the controller, an alternate mapping of the tactile information and alternative contextual information to obtain an alternative task; and
   performing the alternative task at the second geographic location of the touchscreen device, wherein the alternative task performs an alternative action, distinct from the action, in the execution environment of the touchscreen device.

2. The method of claim 1, further comprising:
   identifying the task;
   creating the mapping by associating the task with the tactile information and the contextual information; and
   storing the mapping in the touchscreen device.

3. The method of claim 1, further comprising:
   touching the touchscreen device with the digit, wherein a user touches the touchscreen device;
   choosing the task;
   selecting the mapping of the task to the tactile information and the contextual information; and
   confirming the mapping.

4. The method of claim 2, further comprising:
   disassociating the task from the tactile information and the contextual information;
   identifying the alternative task
   creating the alternative mapping by associating the alternative task with the tactile information and the contextual information;
   storing the alternative mapping in the touchscreen device;
   receiving the tactile information from the digit.

5. The method of claim 1, further comprising:
   scanning a fingerprint from the digit before obtaining contextual information, wherein the tactile information comprises the fingerprint.

6. The method of claim 1,
   wherein the contextual information comprises a first touchscreen coordinate range comprising a first plurality of touchscreen coordinates, wherein the task is performed at the first touchscreen coordinate range,
   wherein the alternative contextual information comprises a second touchscreen coordinate range comprising a second plurality of touchscreen coordinate,
   and
   wherein the alternative task, is performed at the second touchscreen coordinate range.

7. The method of claim 1, further comprising:
   wherein the alternative contextual information comprises a second time, wherein the task is performed at the first time,
   and
   wherein the alternative task, distinct from the task, is performed at the second time.

8. The method of claim 1, further comprising:
   wherein the task is performed in a first touchscreen device application;
   wherein the alternative contextual information comprises a second touchscreen device application;
   and wherein the alternative task, distinct from the task, is performed in the second touchscreen device application.

9. The method of claim 1, further comprising:
receiving concurrent tactile information, wherein the concurrent tactile information comprises concurrent contact between the digit and the touchscreen device and a second digit and the touchscreen device;
identifying the second digit based on the concurrent tactile information;
identifying the alternative task;
creating the alternative mapping by associating the alternative task with the concurrent tactile information and the contextual information; and
storing the alternative mapping in the touchscreen device.

10. The method of claim 9, further comprising:
receiving concurrent tactile information from the digit and the second digit.

11. The method of claim 1, further comprising:
wherein the task is performed at a first rate of movement of the digit;
wherein the alternative contextual information comprises a second rate of movement of the digit; and
wherein the alternative task, distinct from the task, is performed at the second rate of movement of the digit.

12. The method of claim 1, further comprising:
receiving tactile information from a plurality of digits;
identifying the plurality of digits based on the tactile information from the plurality of digits;
translating, using the controller, the mapping of the tactile information and the contextual information to obtain a sequence task; and
performing the sequence task in the touchscreen device.

13. A system for performing a task in a touchscreen device, comprising:
a controller;
a memory operatively connected to the controller;
an input module configured to:
receive tactile information from a digit, wherein the tactile information comprises an identifying portion and a touchscreen location of the digit, and
identify the digit based on the tactile information;
a mapping module configured to:
translate a mapping of the tactile information and contextual information to obtain a task, and
translate an alternate mapping of the tactile information and alternative contextual information to obtain an alternative task; and
a task module configured to:
obtain the contextual information from the touchscreen device,
wherein the contextual information comprises data describing an execution environment of the touchscreen device, and
wherein the contextual information comprises a first geographic location of the touchscreen device;
perform the task at the first geographic location of the touchscreen device, wherein the task performs an action in the execution environment of the touchscreen device;
obtain the alternative contextual information from the touchscreen device, wherein the alternative contextual information comprises a second geographic location of the touchscreen device; and
perform the alternative task distinct from the task, at a second geographic location of the touchscreen device, wherein the alternative task performs an alternative action, distinct from the action, in the execution environment of the touchscreen device.

14. The system of claim 13, further comprising:
a storage device configured to:
store a mapping associating the task with the tactile information and the contextual information; and
a display module configured to:
display content on a touchscreen of the touchscreen device.

15. The system of claim 14,
wherein the mapping module is further configured to:
create the mapping by associating the task with the tactile information and the contextual information; and
wherein the task module is further configured to:
identify the digit based on the tactile information; and
identify the task.

16. The system of claim 14,
wherein the mapping module is further configured to:
disassociate the task from the tactile information and the contextual information; and
create the alternative mapping by associating the alternative task, distinct from the task, with the tactile information and the contextual information,
wherein the task module is further configured to:
identify the alternative task,
wherein the storage device is further configured to:
store the alternative mapping in the touchscreen device.

17. The system of claim 13, wherein a user touches the touchscreen device with the digit, wherein the user chooses the task, wherein the user selects the mapping of the task to the tactile information and the contextual information, and wherein the user confirms the mapping.

18. The system of claim 13,
wherein the task module is further configured to:
perform the task in a first touchscreen device application,
wherein the alternative contextual information comprises a second touchscreen device application, and
wherein the alternative task, distinct from the task, is performed in the second touchscreen device application.

19. A non-transitory computer readable medium storing instructions for performing a task in a touchscreen device, the instructions executable on a processor and comprising functionality to:
receive tactile information from a digit, wherein the tactile information comprises an identifying portion and a touchscreen location of the digit;
identify the digit based on the tactile information;
obtain contextual information from the touchscreen device,
wherein the contextual information comprises data describing an execution environment of the touchscreen device, and
wherein the contextual information comprises a first geographic location;
translate a mapping of the tactile information and contextual information to obtain a task;
perform the task at a first geographic location of the touchscreen device, wherein the task performs an action in the execution environment of the touchscreen device;
obtain alternative contextual information from the touchscreen device, wherein the alternative contextual information comprises a second geographic location;
translate, an alternate mapping of the tactile information and alternative contextual information to obtain an alternative task; and perform the alternative task, distinct from the task, at the second geographic location of the touchscreen device, wherein the alternative task performs an alternative action, distinct form the action, in the execution environment of the touchscreen device.

20. The non-transitory computer readable medium of claim 19, the instructions further comprising functionality to:
    identify the task;
    create the mapping by associating the task with the tactile information and the contextual information; and
    store the mapping in the touchscreen device.

21. The non-transitory computer readable medium of claim 19, wherein a user touches the touchscreen device with the digit, wherein the user chooses the task, wherein the user selects the mapping of the task to the tactile information and the contextual information, and wherein the user confirms the mapping.

22. The non-transitory computer readable medium of claim 19, the instructions further comprising functionality to:
    disassociate the task from the tactile information and the contextual information;
    identify the alternative task, distinct from the task;
    create the alternative mapping by associating the alternative task with the tactile information and the contextual information;
    store the alternative mapping in the touchscreen device;
    receive the tactile information from the digit.

23. The non-transitory computer readable medium of claim 19, the instructions further comprising functionality to scan a fingerprint from the digit before obtaining contextual information, wherein the tactile information comprises the fingerprint.

24. The non-transitory computer readable medium of claim 19,
    wherein the task is performed in a first touchscreen device application;
    wherein the alternative contextual information comprises a second touchscreen device application;
    and
    wherein the alternative task, distinct from the task, is performed in the second touchscreen device application.

* * * * *